United States Patent [19]

Heidenreich et al.

[11] Patent Number: 5,020,650
[45] Date of Patent: Jun. 4, 1991

[54] TORQUE LIMITING CLUTCH HAVING SET TORQUE RANGE OVER ITS USEFUL LIFE

[75] Inventors: David C. Heidenreich, Akron; Keith A. Nichols, North Canton, both of Ohio

[73] Assignee: Power Transmission Technology, Sharon Center, Ohio

[21] Appl. No.: 518,661

[22] Filed: May 3, 1990

[51] Int. Cl.⁵ .............................................. F16D 7/02
[52] U.S. Cl. ..................................... 192/56 R; 464/48
[58] Field of Search ................. 192/56 R; 464/45, 46, 464/47, 48

[56] References Cited

U.S. PATENT DOCUMENTS

| | | | |
|---|---|---|---|
| 2,306,730 | 12/1942 | Holmes | 464/47 |
| 2,939,301 | 6/1960 | Huddle | 464/48 X |
| 2,940,283 | 6/1960 | Christenson et al. | 464/48 |
| 2,953,911 | 9/1960 | Tigerman | 464/48 X |
| 3,100,974 | 8/1963 | Wilson et al. | 464/46 |
| 3,984,999 | 10/1976 | Kopp | 192/56 R X |
| 4,501,570 | 2/1985 | Konrad | 192/56 R X |
| 4,645,472 | 2/1987 | Heindenreich | 464/48 |

Primary Examiner—Allan D. Herrmann
Assistant Examiner—Nicholas Whitelaw
Attorney, Agent, or Firm—Renner, Kenner, Grieve, Bobak, Taylor & Weber

[57] ABSTRACT

A torque limiter has an input flange connected to an output hub through a force generating subassembly which includes a pressure plate and a cover plate having a plurality of springs interposed therebetween. The cover plate is fixedly secured to the input hub in fixed spaced apart relationship. A friction material is secured to opposite faces of a circumferential flange which is integral with the output hub. The friction surfaces engage the pressure plate and input hub, establishing the force transmitting interface. The force generating subassembly has a characteristic spring force associated therewith which is slightly increased when the assembly is completed. The total degradation of characteristic torque diminishes by only ten percent over the useful life of the clutch. The springs are color coded and visually verifiable.

11 Claims, 1 Drawing Sheet 5,020,650

TORQUE LIMITING CLUTCH HAVING SET TORQUE RANGE OVER ITS USEFUL LIFE

TECHNICAL FIELD

The invention herein resides in the art of power transmission devices and, more particularly, to torque limiting clutches of the type providing a torque transfer from an input source to an output member with torque limiting protection.

BACKGROUND ART

It is well known that many mechanical devices operate on a power transfer from one rotating member to another. It is common to connect an input power source to an output driven member by means of a torque limiter of sorts. Indeed, the utilization of torque limiting clutches between input and output members is now a common expedient to prevent damage and unnecessary down time.

It is well known that torque limiting clutches can be assembled to provide a large variety of characteristic break-away torques. Further, the physical size of torque limiting clutches often correlates with the system to be protected and the characteristic torque load. It is well known to those skilled in the art that it is most difficult to design and construct torque limiting clutches which are physically small in size. As the physical size of the torque limiting clutch decreases, the ability to hold close tolerances to maintain fixed and predictable break-away torques decreases. In prior art torque limiting clutches it has also been difficult to verify the torque setting. Additionally, such torque limiting clutches are difficult to assemble, demonstrate high output inertia, are typically characterized by significant changes in the break-away torque over the wear life of the clutch, are given to tampering and/or field adjustments, and are generally incapable of providing means for indicating the state of wear thereof.

While many machines and other devices have need of torque limiting clutches which are physically small in size, no small friction type units are available which are truly effective and reliable in operation.

DISCLOSURE OF INVENTION

In light of the foregoing, it is a first aspect of the invention to provide a torque limiter which is repeatable in design such that close tolerances as to break-away torque can be maintained.

Another aspect of the invention is to provide a torque limiter which, while small in size, is easy to assemble.

Another aspect of the invention is to provide a physically small torque limiter which demonstrates low output inertia.

Still a further aspect of the invention is the provision of a torque limiter which is small in size, but demonstrates consistency in break-away torque over the life of the unit.

Still a further aspect of the invention is the provision of a torque limiter which is not given to tampering and/or field adjustment.

Yet an additional aspect of the invention was the provision of a torque limiter which is small in size, but provides a visual wear indicator.

Still another aspect of the invention is the provision of a torque limiter which is reliable and durable in operation, while being easy to construct with state of the art apparatus and techniques.

The foregoing and other aspects of the invention which will become apparent herein are attained by a torque limiting clutch, comprising: first and second coaxial hubs, said first hub being received upon said second hub; a friction member interposed between said first and second hubs; and a force generating member forcefully engaging said first and second hubs at said friction member.

Still other aspects of the invention which will become apparent herein are attained by a torque limiting clutch, comprising: an output hub; an input hub concentric to and received on said output hub and adapted for relative rotational movement with respect thereto; a friction member extending from said output hub; a cover plate connected to said input hub; a pressure plate interposed between said friction member and said cover plate; and spring means interposed between said pressure plate and said cover plate for urging said pressure plate and input hub into contacting engagement with said friction member.

DESCRIPTION OF DRAWINGS

For a complete understanding of the objects, techniques and structure of the invention reference should be made to the following detailed description and accompanying drawing wherein.

BEST MODE FOR CARRYING OUT THE INVENTION

Figure 1:
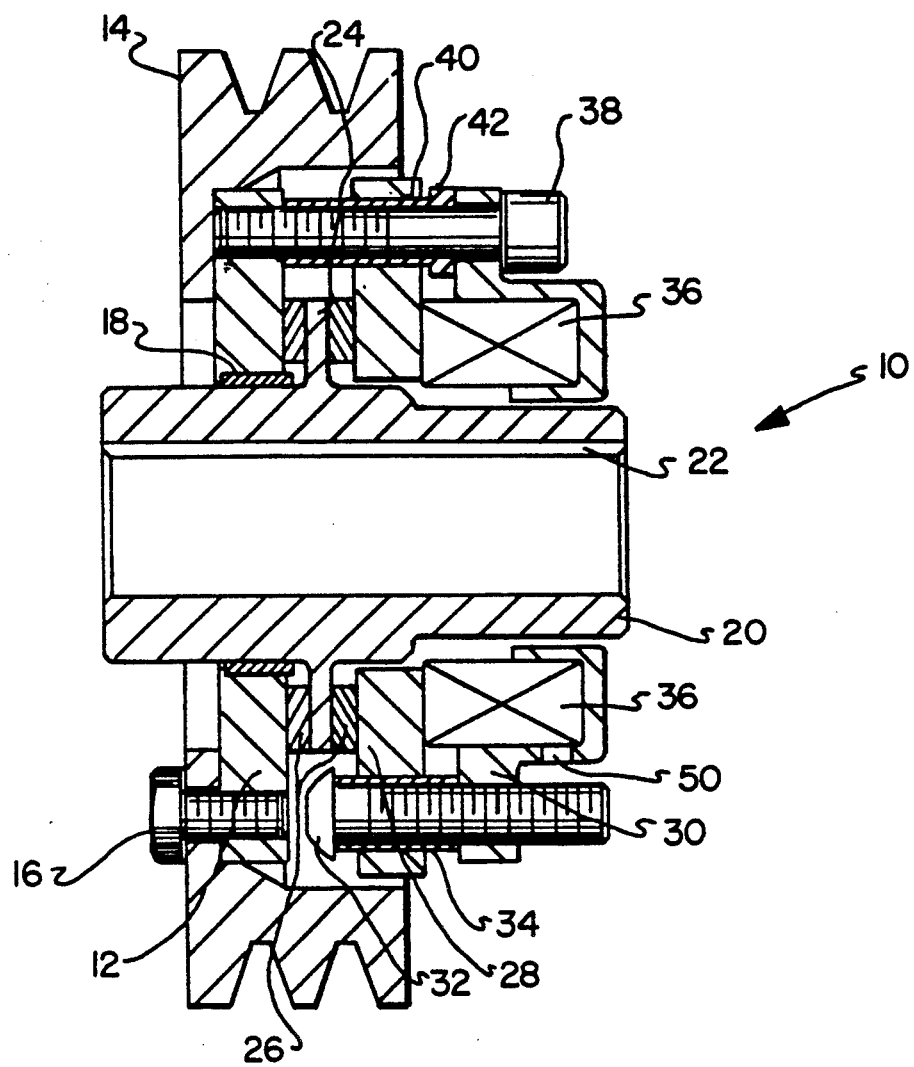
FIG. 1 is a cross sectional view of a torque limiter made according to the invention.
Figure 2:
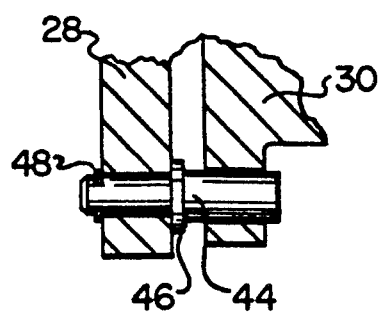
FIG. 2 is a partial cross sectional view of the structure of FIG. 1 showing the wear indicator employed.

Referring now to the drawing and more particularly FIG. 1, it can be seen that a torque limiting clutch according to the invention is designated generally by the numeral 10. An input flange 12, in the form of an annular disc, is adapted to receive a pulley 14 secured thereto by a plurality of bolts 16 which are preferably spaced equidistantly thereabout. The pulley 14 serves as a power input source and, within the concept of the invention, could also accommodate a chain drive or appropriate flexible coupling.

An inner annular circumference of the input flange 12 receives a sleeve bearing 18 mounted upon an output hub 20. As shown, the output hub 20 is preferably in the form of a tubular shaft, though it can take any of various configurations. In any event, the sleeve bearing 18 is provided to maintain concentricity of the output hub 20 with the input flange or disc 12. A keyway 22 is provided within the inner bore of the tubular output hub 20 for purposes of engaging an appropriate output shaft or the like. Such engagement and interconnection is, of course, well understood by those skilled in the art.

Extending from and encircling the output hub 20 is a circumferential flange 24 which, in a preferred embodiment of the invention, is integral with the output hub 20. Bonded or affixed to each of the flat planar surfaces of the flange 24 are friction surfaces 26.

A pressure plate 28, in the form of an annular disc, is secured to a spring cover 30 by means of a plurality of bolts 32 threaded into the cover 30 as shown. A sleeve 34 is positioned about the upper portion of the each of the bolts 32 and is received within an appropriate bore within the pressure plate 28. A plurality of springs or spring assemblies 36 are received within appropriate recesses within the cover 30 and extend therefrom into engagement with the pressure plate 28 as shown. As will be readily appreciated by those skilled in the art, the characteristic break-away torque of the torque limiting clutch 10 will be a function of the number, size, and compression of the springs 36 received by the cover 30 and urged against the pressure plate 28.

It should now be appreciated by those skilled in the art that the elements 28–36 comprise a force generating subassembly. It will further be appreciated that with the springs 36 received by the cover 30, the pressure plate 28 is then placed into position such that the bores therein for receiving the sleeves 34 align with the bores within the cover 30 for receiving the bolts 32. As the bolts 32 are threaded into the cover 30, the pressure plate 28 is drawn against the springs 36, precompressing the same until the sleeve 34 prevents further movement of the bolt 32. The springs 36 urge the pressure plate 28 against the heads of the bolts 32. Accordingly, the subassembly 28–36 positions the pressure plate 28 at its maximum extension from the cover 30 and further establishes the minimum compression of the springs 36 which will be evidenced at the end of the wear life of the torque limiting clutch 10.

The subassembly 28–36 is then secured to the input flange 12 by means of bolts 38, threadedly engaging the output hub 12. A spacer sleeve 40 is received about each of the bolts 38 and serves as a force carrying member when relative rotation between the input flange 12 and output hub 20 is engaged. The spacer sleeve 40 has a collar 42 at one end thereof to assist in assembly.

It will be readily appreciated by those skilled in the art that as the bolts 38 are tightened, the spacer sleeve 40 fixes the separation between the cover plate 30 and the input flange 12 by abutting the interior surfaces of those members respectively. As the bolts 38 are tightened, the springs 36 are further compressed as the pressure plate 28 abuts the flange 24 and friction surface 26 while the cover 30 is drawn toward the input flange 12. This additional compression of the springs 36 is preferably on the order of an additional ten percent over that present in the springs 36 when the subassembly 28–36 is made. As will be appreciated by those skilled in the art, the separation of the pressure plate 28 from the heads of the bolts 32 constitutes the wear distance of the friction surfaces 26. Obviously, once the friction surfaces wear to the point that the pressure plate 28 contacts the heads of the bolts 32, the life of the torque limiting clutch 10 has ended.

According to the invention, the springs 36 are precompressed to such a degree in the subassembly 28–36 that the additional compression of such springs by means of the bolts 38 constitutes merely an additional ten percent of force load such that the force variation of the torque limiting clutch 10 over its useful life diminishes by only ten percent from beginning to end.

Those skilled in the art will readily recognize that the bolts 38 with the sleeves 40 interposed between the input flange 12 and cover 30 establish the minimum separation between the cover 30 and pressure plate 28 while also allowing the springs 36 to impart the maximum force to the pressure plate 28.

As presented above, the useful life of the torque limiting clutch 10 ends when the pressure plate 28, slidably received upon the sleeves 34, 40, contacts the heads of the bolts 32. It is most desirable to be able to anticipate the end of clutch life. To that end, a wear indicator pin 44 is secured to the pressure plate 28 by means of an integral flange 46 on one side thereof, and a retainer ring 48 on the other. Accordingly, the pin 44 moves axially with the pressure plate 28. As the friction surfaces 26 wear, the extension of the pin 44 beyond the surface of the cover 30 diminishes. If the pin 44 is designed to extend above the surface of the cover plate 30 a distance equivalent to the initial separation between the pressure plate 28 and bolt heads 32, then the wear pin 44 will be flush with the top surface of the plate 30 when the wear life has terminated.

In a preferred embodiment of the invention, the diameter of the torque limiting clutch 10 is four inches or less, while the axial length is on the order of 2.5 inches or less. Accordingly, the torque limiting clutch 10 is small and compact, yet capable of providing the requisite torque limiting functions.

In operation, an input power source is connected to the pulley 14 while an output shaft is keyed to the keyway 22 of the output hub 20. The characteristic breakaway torque of the clutch 10 is determined by the number and size of the springs 36. The springs 36 are color coded as to their force or torque characteristics. Slots 50 in the spring cover 30 allow visual verification of the torque settings. So long as the torque passed from the input to the output does not exceed the characteristic break-away torque, the engagement between the input flange 12 and output hub 20 through the friction surfaces 26 under forceful application of the pressure plate 28 causes the input 12 and output 20 to rotate in unison. Should the torque exceed the characteristic level, relative rotation of the input flange 12 of the output hub 20 will be experienced as slippage occurs at the interfaces of the friction surfaces 26. The rotational forces are transmitted through the sleeve 40.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A torque limiting clutch, comprising;
   first and second coaxial hubs, said first hub being received upon said second hub;
   a friction member interposed between said first and second hubs; and
   a force generating member forcefully engaging said first and second hubs at said friction member, wherein said force generating member comprises a pressure plate interconnected with a cover member and a plurality of spring means interposed between said pressure plate and cover member for urging said pressure plate and cover member apart, said pressure plate and cover member being interconnected by first bolts threaded to said cover member and slidingly receiving said pressure plate, each said first bolt passing through a first sleeve passing through said pressure plate, said first sleeve and first bolt establishing a maximum separation between said pressure plate and said spring cover and further establishing a minimum spring force on said pressure plate by precompression of said spring means.

2. The torque limiting clutch according to claim 1, wherein said force generating member is secured to said first hub by second bolts threaded thereto, said second bolts passing through a second sleeve which passes through said pressure plate, said second sleeve permitting axial movement of said pressure plate and fixedly separating said first hub and said cover member.

3. The torque limiting clutch according to claim 2, wherein said second hub is a tubular member and said friction member comprises a radial flange extending from said tubular member and having friction material bonded thereto.

4. The torque limiting clutch according to claim 3, wherein said first hub comprises a disc received upon said tubular member with a bearing interposed therebetween for concentrically aligning said first and second hubs and providing for relative rotational movement therebetween.

5. The torque limiting clutch according to claim 4, further comprising a pin fixed at one end to said pressure plate and extending at an opposite end from said cover by an amount indicative of a thickness of said wear material.

6. The torque limiting clutch according to claim 2, wherein said cover member has a slot therein exposing said spring means, said spring means being color coded as a function of a characteristic torque of said torque limiting clutch.

7. A torque limiting clutch, comprising:
an output hub;
an input hub concentric to and received upon said output hub and adapted for relative rotational movement with respect thereto;
a friction member extending from said output hub;
a cover plate connected to said input hub;
a pressure plate interposed between said friction member and said cover plate, and
spring means interposed between said friction member and said cover plate for urging said pressure plate and input hub into contacting engagement with said friction member, wherein said friction member comprises a flange integral with said output hub and having friction material bonded thereto, said cover and pressure plates being interconnected by first bolts threaded to said cover, each of said first bolts having a first sleeve about a portion thereof receiving said pressure plate, said first sleeve extending between a head of said first bolt and said cover plate and establishing a maximum separation between said cover and pressure plates and a minimum force imparted by said spring means.

8. The torque limiting clutch according to claim 7, wherein said cover plate and input hub are interconnected by second bolts passing through second sleeves, said second bolts and sleeves retaining said cover plate and input hub in fixed spaced apart relation.

9. The torque limiting clutch according to claim 8, wherein said second sleeves further establish a minimum separation between said cover and pressure plates, and a maximum force imparted by said spring means.

10. The torque limiting clutch according to claim 7, further comprising a wear pin fixed at one end to said pressure plate and extending through a bore in said cover plate.

11. The torque limiting clutch according to claim 9, wherein said spring means bear a visual indicia of a characteristic torque of said clutch, and wherein said cover has an opening therein exposing said indicia.

* * * * *